(12) United States Patent
Wilburg et al.

(10) Patent No.: US 9,867,511 B1
(45) Date of Patent: Jan. 16, 2018

(54) HIGH EFFICIENCY EVAPORATIVE/DEHYDRATION TOILETS

(71) Applicants: Jerry Duane Wilburg, Broken Arrow, OK (US); Lawrence James Losoncy, Tulsa, OK (US); Ted Knight, Arlington, VA (US)

(72) Inventors: Jerry Duane Wilburg, Broken Arrow, OK (US); Lawrence James Losoncy, Tulsa, OK (US); Ted Knight, Arlington, VA (US)

( * ) Notice: Subject to any disclaimer, the term of this patent is extended or adjusted under 35 U.S.C. 154(b) by 0 days.

(21) Appl. No.: 15/069,544

(22) Filed: Mar. 14, 2016

Related U.S. Application Data

(63) Continuation-in-part of application No. 13/975,028, filed on Aug. 23, 2013, now Pat. No. 9,301,659, and a continuation-in-part of application No. 12/837,999, filed on Jul. 16, 2010, now abandoned.

(60) Provisional application No. 61/692,288, filed on Aug. 23, 2012, provisional application No. 61/225,980, filed on Jul. 16, 2009.

(51) Int. Cl.
  *A47K 11/02* (2006.01)
(52) U.S. Cl.
  CPC .................... *A47K 11/02* (2013.01)
(58) Field of Classification Search
  CPC ............... A47K 11/02; A47K 11/023
  See application file for complete search history.

(56) References Cited

U.S. PATENT DOCUMENTS

| | | | |
|---|---|---|---|
| 3,921,228 A | 11/1975 | Sundberg | |
| 4,044,406 A | 8/1977 | Hargraves | |
| 4,174,371 A | 11/1979 | Bell et al. | |
| 4,608,175 A | 8/1986 | Nuttle | |
| 5,152,074 A | 10/1992 | Kishi | |
| 5,276,924 A | 1/1994 | Hachima | |
| 5,337,422 A * | 8/1994 | Blankenship | A47K 11/023 4/111.5 |
| 5,996,136 A | 12/1999 | La Trobe | |
| 7,211,187 B2 * | 5/2007 | Lumbert | C02F 1/78 210/153 |
| 7,998,226 B2 | 8/2011 | Galloway | |
| 2008/0295237 A1 | 12/2008 | Kurtz | |

OTHER PUBLICATIONS

Bhanoo, Sindya N., "For Pennies, a Disposable Toilet That Could Help Grow Crops," The New York Times, Science, http://www.nytimes.com/2010/03/02/science/02bag.html (Mar. 1, 2010).

(Continued)

*Primary Examiner* — Janie Loeppke
(74) *Attorney, Agent, or Firm* — Nixon & Vanderhye P.C.

(57) ABSTRACT

An appliance that dries and sanitizes solids, evaporates liquids, using air flow and short bursts of heat developed by an induction heating unit that relies on eddy currents of a ferromagnetic collection pan to dry the solids and evaporate the liquids. The pan is removed and the treated matter is disposed of. The unit is lightweight, needs only to be vented, plugged in and is ready to use. It is mobile, works off of conventional power mains, generators and/or solar. No special type of toilet paper is involved, there is no composting, no fire, and there are no chemicals.

19 Claims, 8 Drawing Sheets

(56) References Cited

OTHER PUBLICATIONS

Jernkins, Joseph, Humanure Handbook, Third Edition, Chapter 5: Global Sewers and Pet Turds, http://weblife.org/humanure/chapter5_11.html (2005).
Losoncy, Lawrence, Ezine Articles, Inexpensive Alternative—Non Discharge Sanitation—A Guide, http://ezinearticles.com/?Inexpensive-Alternative-Non-Discharge-Sanitation-A-Guide&id=906966 (2011).
Rooney, Ben, "Microwave Toilet Could Solve Africa Sanitation Problems," http://blogs.wsj.com/tech-europe/2011/07/21/microwave-toilet-could-solve-africa-sanitation-problems/ (Jul. 21, 2011).
Rooney, Ben, "Microwave Toilet?, Microwave Toilet Could Solve Africa Sanitation Problems, "http://www.nixcoplumbing.com/2011/07/21/microwave-toilet/ (2011).
Delft University of Technology, "Reinventing the toilet for safe and affordable sanitation," http://tudelft.nl/en/current/latest-news/article/detail/tu-delft-vindt-toilet-opnieuw-uit-voor-veilig-en-betaalbaar-sanitair/ (Jul. 19, 2011).
Incinolet, Electric Incinerating Toilet, The Incinolet Advantage, http://www.incinolet.com/aboutus_2.htm (2006).
Science Daily, "Reinventing the toilet for safe and affordable sanitation," http://www.sciencedaily.com/releases/2011/07/110719094025.htm (Jul. 19, 2011).
Sulabh International Social Service Organisation, Museum of Toilets, http://www.sulabhinternational.org/pages/museum_toilets.php (2011).
Unknown Country, Strieber, Anne Editor in Chief,"What we need is a Microwave toilet," http://www.unknowncountry.com/news/what-we-need-microwave-toilet (Jul. 28, 2011).

\* cited by examiner

HIGH EFFICIENCY EVAPORATIVE/DEHYDRATION TOILETS

CROSS-REFERENCE TO RELATED APPLICATIONS

This application is a continuation-in-part of U.S. patent application Ser. No. 13/975,028 filed Aug. 23, 2013; which claims the benefit of U.S. Provisional Application No. 61/692,288 filed Aug. 23, 2012; U.S. patent application Ser. No. 13/975,028 is also a continuation-in-part of U.S. patent application Ser. No. 12/837,999 filed Jul. 16, 2010 (now abandoned); which claims the benefit of U.S. Provisional Application No. 61/225,980 filed Jul. 16, 2009. Each of these prior applications is incorporated herein by reference in its entirety as if expressly set forth.

FIELD

The technology herein relates to environmentally-conscious self-contained waste disposal systems, and more particularly to an evaporative, sanitizing toilet system that receives human waste, evaporates liquids and moisture from the solids such that the solids get dried and reduced in volume for sanitary and environmentally sound disposal, and eliminates the liquids by evaporation.

BACKGROUND AND SUMMARY

Writing in the May 19, 2008 NY Times Op Ed section, Rose George talks about the health hazards posed by lack of proper sanitation. Cyclone Nargis struck a region with almost no toilets. One gram of human solid waste can contain up to 10 million viruses and 50 communicable diseases. These diseases include cholera, meningitis and typhoid. In the world today, diarrhea trails only pneumonia as the biggest killer of small children, greater than tuberculosis, AIDS or malaria. Rose George notes that the number of children killed by diarrhea is equivalent to a jumbo jet crashing every hour.

Gone forever are the days when it didn't matter if on occasion somebody used trees and weeds to relieve themselves. It matters now because there are so many people that what we leave can easily come in contact with another person, simply because there are so many of us even in out of the way places. It should also be noted: the disease-bearing pathogens quickly die when exposed to oxygen. That is why cow patties do not pose any great harm. Most of the pathogens are in the solids, not the urine. If the solids are on top of the ground, they will quickly become harmless. It is when solids get covered with dirt that the pathogens have a better chance to survive, because they are protected from oxygen.

Please accept apologies for any breach of etiquette this information may seem to present. None of us enjoys bringing up subjects like human waste. In fact, as Rose George points out, reluctance to talk about these sorts of things is rampant in the world today. It greatly hinders the effort to get an accurate focus on the true dangers being posed in disaster areas—the terrible danger of disease being spread because of inadequate sanitation facilities.

Parks and campsites are subject to the same dangers. It is important that there be adequate and easily accessible sanitation facilities wherever people might go walking, seek solitude, play, fish or watch birds. The trouble starts when such facilities are not readily available or amenable.

The trouble also starts in times of flooding. It only takes one flood, hence the importance of planning ahead. What is the plan for evacuation for your park or campgrounds in the event of flooding? Flooding need not be a hurricane or typhoon or tidal wave. It can be caused by a one-hour cloudburst. Two or three feet of water in the wrong place can be a flood that can present the dangers of sanitation.

We all need to pay careful attention to the regulations governing health and environmental protection. For many of us, regulations constitute an obstacle. Some view them as added expenses, added delays in obtaining permits, or irritants serving no useful purpose. But in fact regulations evolve out of experience. What is learned in one or several previous situations gives rise to regulations designed to prevent more of the same.

Many people think the U.S. Environmental Protection Agency regulates sanitation and wastewater systems. It does not. Each state regulates sanitation disposal. EPA sets standards for environmental safety: ground, air and water. It also receives information and monitors what is happening to the environment, providing important research and data to the states so that the best environmental practices can be reflected in regulating wastewater. Industrial wastes are a very large concern as are the sanitary waste materials generated by homes, cabins, recreational vehicles, mobile trailer homes, other vehicles and campsites. Given that our usable water comes from a very limited supply (wells, lakes, rivers and aquifers that can easily be polluted), it is vital that regulation be based on solid information and good science.

Problem number one is the use of water to flush waste. A single flush can use up to eight gallons of water, with a household of four people using more than two hundred gallons a day just to flush the toilet. Low-flow toilets address this problem by reducing the amount of water used and increasing the velocity of the flush. Waterborne sanitation is often perceived as the normal method for the disposal of human waste. Due to its "flush and forget" nature, it is seen as the ideal solution. But the strain on water resources is enormous. To flush away 100 gallons of human waste, which is the average amount per year per person, it can take more than 8,000 gallons of water. (8 flushes per day times an average of 3 gallons of water per flush.) For the most part, the water used to flush is treated water or high quality well water. Multiply that many gallons of water by the 300 million persons living in the United States: more than 2 trillion gallons of high quality water being used to flush. Added to this is the cost of operating and maintaining treatment plants and septic systems to accomplish the absurd: treating the once-treated water again to make it safe for discharge into the ground or body of water absorbing the waste water.

It does not require rocket science to figure out that in a time of severe drought, rising demands on dwindling supplies of usable water and rising treatment costs, there must be a better way to dispose of human sanitary waste. As any environmentalist will quickly point out, non-discharge toilets or sanitation treatment systems would make far more sense and be much cheaper to operate than the traditional waterborne sanitation that has us flushing toilets and urinals around the clock.

Problem number two is when the ground cannot properly handle human waste at a given site or in a given watershed area that would otherwise use a septic system. Categories of products and systems addressing this problem include advanced treatment systems, microbiotic treatment systems, portable potties, holding tanks, lagoon systems, evapotranspiration systems, chemical toilets, digestor tanks, composting toilets, incinerating toilets and evaporative toilets.

The face of the future is to be found in the use of alternative toilets and sanitation systems in the nation's parks, recreation areas and campgrounds and by individuals where waterborne sanitation is not always feasible due to water shortages, pollution, costs, climatic conditions and impractical applications. The result has been the pursuit of alternative forms of sanitation such as pit latrines, composting toilets, chemical toilets, incendiary toilets and waterless evaporation toilets (dry sanitation). Each of these systems has its merits and, like all sanitation systems, none is perfect.

Information is available on the Internet for anyone researching alternatives to flush toilets, septic systems and hookup. Most of these products and technologies have been designed to address one or both of the two central problems presented by flushing away human waste. There are four main categories of waterless toilets and sanitation systems on the market. These include portable toilets, frequently seen at construction sites; vault toilets, often found in large parks; composting toilets; and evaporative sanitation systems. The following chart demonstrates some differences among the main alternative types that are non-discharge:

| | Sanitation Type | | | | | |
|---|---|---|---|---|---|---|
| | Compost | Chemical | Latrine | Incendiary | Septic | Dry |
| Discharges | No | No | No | No | Yes | No |
| Uses water | No | No | No | No | Yes | No |
| Uses chemicals | No | Yes | Yes | No | No | No |
| Must pump | No | Yes | Yes | No | Yes | No |
| Must dump | Yes | Yes | Yes | Yes | No | No |
| Must perc | No | No | No | No | Yes | No |
| Needs power | No | No | No | Yes | No | No |
| Odors present | Yes | Yes | Yes | Yes | Yes | No |

By way of terminology: on-site sanitation means those systems that take care of sanitation on location, as opposed to using sewer lines that take the waste to a central treatment site. Non discharge systems are those that do not put anything into the ground. The two most prevalent ways for disposing of sanitation are sewer line hookup and septic systems. Septic systems are on-site systems that discharge treated waste into the ground. Alternative systems are all other systems besides flush toilets on sewer hookup and septic systems.

Composting toilets: the advantage of these toilets is that they yield a usable by-product. Coming in a variety of sizes, they are an economical way to have sanitation treatment, especially with very low usage. They do require attention and are effective only within a narrow temperature and humidity range.

Chemical toilets: these are intended to be pumped. Porta-potties are the best known and most widely used. Other smaller versions of chemical toilets for low usage such as on boats and at sites used only intermittently provide a low-cost way of handling human waste. These systems require pumping and what is pumped must be disposed of according to local code.

Pit latrines: handy for outdoor use, especially in the camp and wilderness settings. While they may be dug by hand and buried in some settings, most jurisdictions that still allow pit latrines require that they be pumped.

Incendiary toilets: these evaporate waste with the use of high temperature heat.

Dry evaporative toilets: evaporate liquids and dry the solids.

What each of these types have in common is that they put nothing into the ground and do not use water. They differ in design, size, capacity, price and method of disposal. The user, therefore, will need to consider space and placement requirements, along with anticipated volume of usage, maintenance and any pumping requirements.

Portable toilets/chemical toilets simply collect the waste in small tanks that have a substantial amount of liquid chemicals pre-loaded for the purpose of killing pathogens and controlling odor. The tanks are then pumped and trucked away for disposal or drained into septic systems or sewers. Variations of these are also used in RV's, boats, trains and planes.

Composting toilets collect human waste and turn it into humus.

Incinerating toilets burn the waste, reducing it to a fine ash.

Evaporating toilets evaporate the waste.

Depending on the methodology, these alternative systems either reduce or eliminate the amount of waste needing to be pumped.

Here is some additional possibly relevant terminology:

On-site treatment: just over half of the wastewater from homes and structures in the United States is discharged into collecting lines (sewer mains) that take it away to wastewater treatment plants, lagoons or other types of centralized treatment. "On-site treatment" is the term used when this is not the case and instead the wastewater is treated at the point where it leaves the structure. The most common systems for on-site treatment are septic systems. These are called "on-site treatment systems".

Discharge systems: are designed to both treat wastewater and put it into the ground differently than septic systems. The two most common types are aerobic systems and microbiotic systems.

Aerobic systems: spray the treated wastewater onto the surface of the ground instead of discharging it under the surface.

Microbiotic systems: may discharge the treated wastewater onto the surface or under the surface. They add microbes to bacteria already present to treat the wastewater.

Non-discharge systems: those systems that treat the wastewater but do not put anything into the ground. These systems are not capable of handling large amounts of wastewater. They are typically waterless systems or very low water use systems and are only used for treating sanitation discharge (what comes out of the toilet).

Composting systems treat the sanitation and turn it into material which can be used as soil enrichment.

Evaporative systems get rid of the liquids and render the solids harmless, reducing and drying them in the process.

Vault toilets: holding tanks with a toilet. They are commonly found in outdoor settings such as parks, and at roadside restroom facilities.

Chemical toilets: waterless toilets with a holding tank. Heavy use of chemicals kill the pathogens. Portable toilets are a common variation of chemical toilets and are most often referred to as porta potties or porta johns.

Codes: are the regulations governing sanitation systems. Each state has these codes. Counties and cities usually are given authority to add to the state codes and, in some instances, to allow variances from the codes suited to specific situations. They exist to protect human health and the environment. Before permits are issued for the installation of any sanitation system information about the site is required to make sure that the system is properly matched to the site conditions and the intended use. The permitting process is handled by the local Health or Environmental Protection Departments or both.

Much work has been done in the past to develop evaporative sanitizing toilets that are efficient and cost-effective. Further improvements are possible and desirable.

BRIEF DESCRIPTION OF THE DRAWINGS

The following detailed description of exemplary non-limiting illustrative embodiments is to be read in conjunction with the drawings of which.

DETAILED DESCRIPTION OF NON-LIMITING EXAMPLE EMBODIMENTS

The example non-limiting technology herein provides the human sanitation system of the future. It can be used anywhere that humans need convenient and comfortable sanitation facilities such as boats, house boats, boathouses, recreational vehicles, cabins, flatbed trailers, homes, offices, and parks. The example non-limiting embodiment does not discharge waste into the ground, rather it evaporates and sanitizes the waste.

The example embodiment thus embodies the entire dream for waterless toilets:
- waterless
- no chemicals
- no odors
- large capacity
- minimal maintenance
- kills harmful bacteria
- power versatility
- simple to install
- small and light weight
- functional in freezing climates
- environmentally friendly The example non-limiting embodiment uses magnetic induction heating with an appropriately configured ferromagnetic pan sitting on top of the induction heater. In order for the user to get at the heating plate and collection pan, he or she will simply pull out a drawer. The heater and pan sit in that drawer. When pulled out, the pan can be emptied, and when closed, the pan is repositioned to a collection position.

A timing function is provided for the heating unit. The timer can be external or built-in to the heating unit.

In one example implementation, the induction heating plate set at 390 degrees F. brings liquid to boil in about 10 seconds. Such an example non-limiting arrangement will evaporate 14 ounces in approximately 7 minutes. Therefore the heat only needs to be run in very brief intervals. In one example configuration, it can be run for about 10 minutes after every 5 uses and, if the liquids start to collect, it could be run for 15 minute intervals.

The control circuitry may actuate and power a blower (e.g., blowing 75 cubic feet of air per minute through the unit) to appropriate external venting. Such venting can allow the evaporated water vapor from the liquid and solids to escape from the toilet enclosure in a sanitary and effective manner. Such venting reduces odor and prevents the toilet from changing the humidity of its surroundings.

Additional example features include:
- A timer-controlled induction heater
- Activate ventilation which can be on continuously or controlled based on a humidity or other sensor
- Removable ferromagnetic waste pan
- Safety and sanitary features.
- Very small and of light weight less than 3 feet by 2 feet by 1.5 feet or 25"×17"×21" and 43 lbs.
- Strong air flow: 50 or 70 cubic feet per minute, 72,000 cubic feet per 24 hour period
- Uses very little energy: for example, one kilowatt per day
- No odor due to induction heat killing the bacteria and constant venting
- No chambers
- Numerous safety features
- Meets or exceeds applicable health safety standards
- Easy installation—just connect the vent pipe and plug in the unit
- Conserves water and is non-polluting to the environment
- Lab tested to meet or exceed health safety standards
- The heating element is controlled with a timer.
- No moving parts required for operation other than the blower motor.
- The unit draws in air under the seat and the fan runs 24/7 to ensure drying and venting. It is versatile and can run on conventional household current, solar or generated power.
- If there is danger of flooding, the unit can be taken to higher ground. Just empty, unplug and transport it. The unit weighs about 43 pounds. It simply needs to be vented—either attaching it to an existing vent or venting through an outside wall, window or roof
- A toilet seat safety latch
- Waterless means it truly does not use water. The example non-limiting implementation evaporates liquids and dries and shrinks solids. No chemicals whatsoever are used. There is nothing to add, turn or fuss with.

Example non-limiting safety features include:
- A Ground Fault Interrupter (GFI) prevents electricity arcing and ground loops
- The timer holds the temperature when the heater is on and lower than what is required to burn paper
- Waste matter is sanitized and the pathogens are rendered harmless or killed, as confirmed by lab tests
- There is no smell because odor is generated by bacteria and, when they are killed, there is no odor. Harmful bacteria are killed with heat. The sanitizing toilet evaporates liquids and dries and shrinks solids. The frequency with which waste is removed depends upon the number of uses. The average family of four will dispose of the processed sanitized waste every few days. This is accomplished by removing the waste pan through the convenient drawer in the unit and emptying it in the household trash.

One example embodiment of a sanitizer toilet is a compact (e.g., 25" l×17" w×20" h) self-contained toilet that is ideal for homes, buildings, recreational vehicles, and other locations where traditional sanitation is unavailable or impractical. The toilet's small size makes it easy to locate it exactly where a toilet is most needed, and it requires no water or chemicals, no sewage or drain hookups, and no pumping or dumping. The example sanitizer toilet reduces human waste to a lightweight, odorless, sanitized form that is easily discarded with household trash or otherwise. It is easy to install and maintain, and it is an ideal solution wherever traditional sanitation is unavailable or impractical, such as:

new residences
 apartments or homes with outdated or faulty sewer systems
 cabins, camps, boathouses, and other recreational sites
 military bases, outposts, and training areas
 natural disaster areas, where sanitation is crucial and conventional systems are compromised
 recreational vehicles, boats, and emergency response vehicles.

An example non-limiting example provides an appliance that dries and sanitizes solids, evaporates liquids, using air flow and short bursts of induction powered heat. The treated matter is disposed of in the household trash. The unit weighs less than 50 pounds, needs only to be vented, plugged in and is ready to use. It is mobile, and works off of conventional power sources such as household electrical outlets, generators and solar power. No special type of toilet paper is needed, there is no composting, no fire, and there are no chemicals or water. The user will simply empty the waste pan every few days.

In one example embodiment, liquid and solid human waste is subjected to constant air flow instantly beginning the drying process by drawing air in from under the toilet seat, down and out the vent. When the waste pan is full, it is removed by opening the drawer and removing the waste pan and safely discarding it in the trash.

How it works: The example non-limiting embodiment is an evaporative toilet. Air is constantly pulled into the unit from under the toilet seat to de-water the solids and evaporate the liquids. The heat at 390 degrees F. kills harmful bacteria in the solids which is hot enough to sanitize the solids but not hot enough to burn toilet paper. It also speeds up the drying process by boiling the liquids.

The fan constantly circulates air through the unit and the exhaust vent at 75 cubic feet per minute, drawing any and all odors away from the room. In the event you plan to be away for extended periods of time and to guard against a power outage, run the heater for 10 minutes or less, making sure not to run it completely dry. Then let the blower run until the solids are dry enough to empty out of the collecting pan. In the event of a power outage, remove the collecting pan quickly or switch to an alternative power source such as generator or solar panel, using an adapter. If the solids are not dry enough, sprinkle a kitty litter or other drying material on top to absorb moisture after the heating unit is turned off, then empty the collecting pan.

The example non-limiting implementation kills bacteria to eliminate odors and make the waste suitable for disposal in the household trash. The fan will constantly circulate air through the unit thereby evaporating the liquids and drying the solids. If the fan stops, there may be odors in the room unless the contents of the unit are emptied. If the unit will not be used for a few days or if there is a power failure, unplug it and empty the collecting pan to ensure that there will be no odor.

The unit will evaporate liquids at the rate of about four to five uses per hour if the heater is run for 10 minutes after every 5 uses or 96-120 uses over 24 hours. If used more at one time and less at another time it will catch up on the drying process. Because the blower is venting out air non-stop there will be no odor buildup. Allow the blower to keep operating even when emptying out the collecting pan, assuring that any and all moisture and odor is sucked out from the toilet.

The user deposits both urine and feces into the same pan that sits beneath the toilet seat. The constant air flow instantly begins drying the deposited matter while also drawing air in from under the toilet seat, down and out the vent, away from the room in which the toilet is set, creating the effect of a negative vacuum to keep any odor from going anywhere except out the vent.

When the pan is full, the user will open the drawer of the toilet unit, remove the pan, and dump the sanitized and dried matter into the trash. This sanitized dried waste is desiccated, virtually odorless, and bacteria free.

The structure provides simplicity: just a pan that gets heated. No need for complicated installations, no need to fuss with the contents like composting units. Very low energy, 1 kilowatt of electricity per day. Lightweight so the unit is portable: can be moved to high place when there is flooding and can be taken with owner if moving to a new home. For the user this is the lowest possible maintenance there could be: plug in the unit, use it, dispose of the pan contents at time intervals depending on use.

The example non-limiting implementation is thus a one-of-a-kind advanced waterless evaporative sanitation system, simple to use, environmentally sound and built to last.

Example Non-Limiting Components

Figure 1:
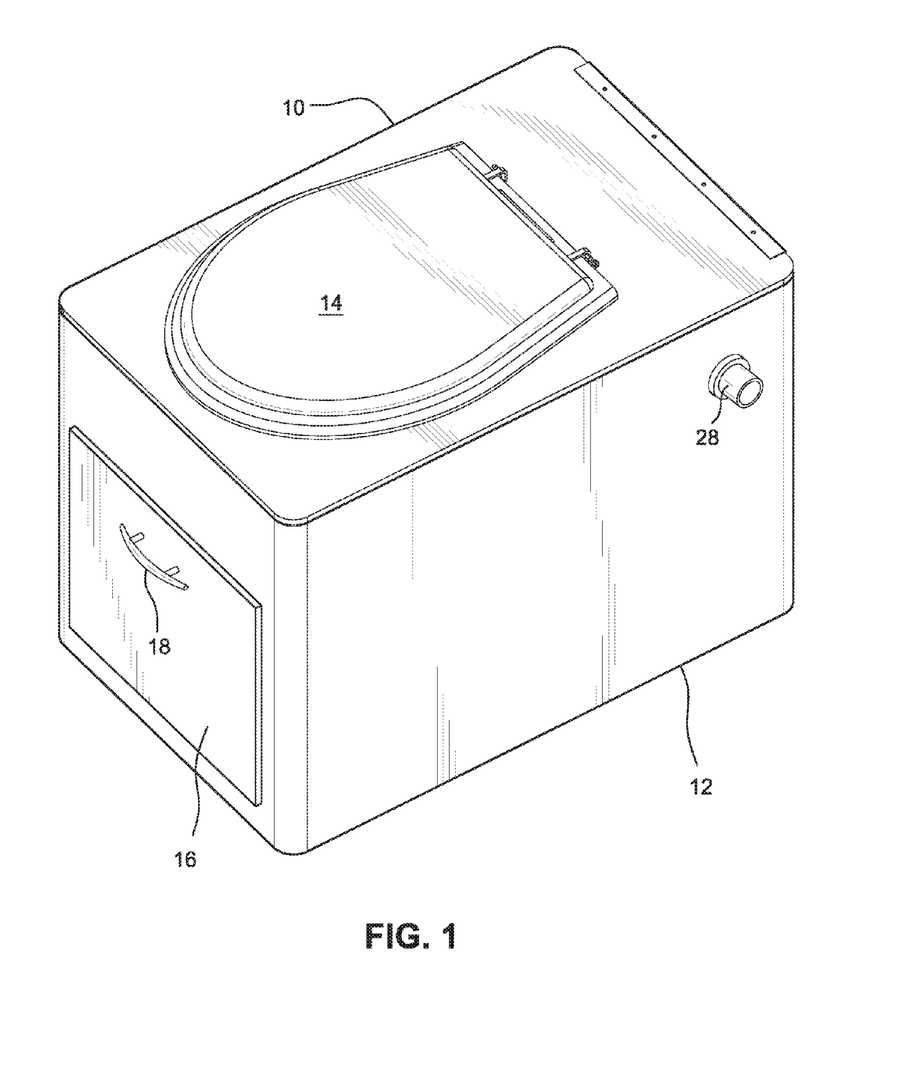
FIG. 1 shows a side elevated view of an example non-limiting evaporative toilet.
Figure 2:
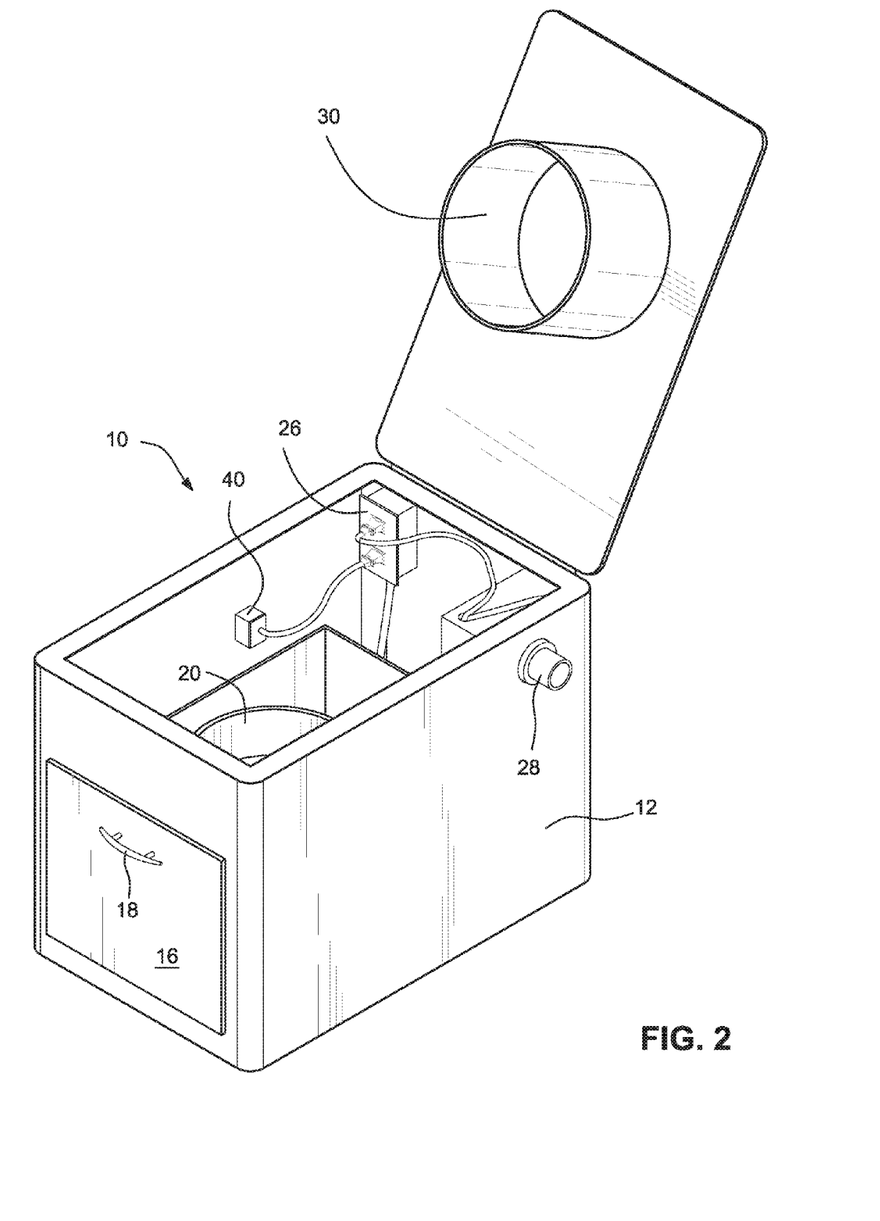
FIG. 2 shows the FIG. 1 toilet with a top panel open.
Figure 3:
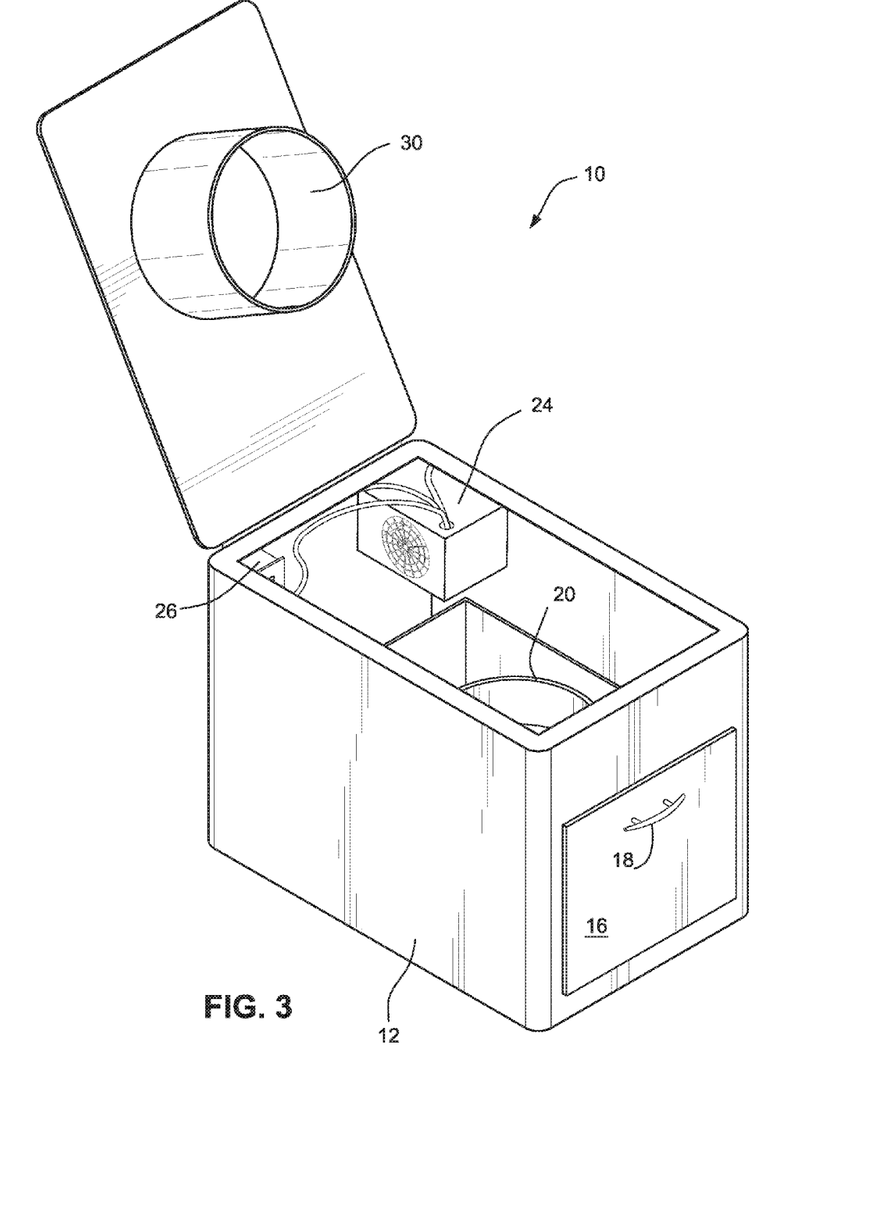
FIG. 3 shows another view of the FIG. 1 toilet with the top panel open.
Figure 4:
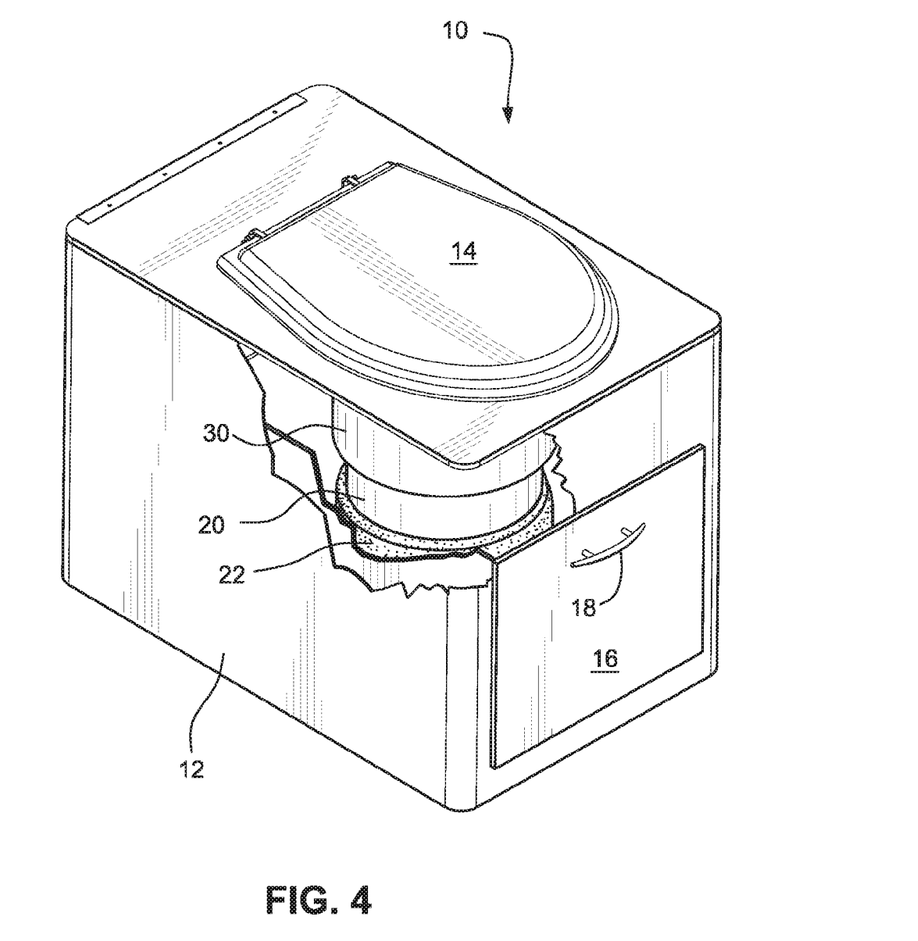
FIG. 4 shows a cutaway view of the FIG. 1 toilet.

The example non-limiting toilet 10 shown in FIG. 1 includes an enclosure 12 made of aluminum or other durable, rugged, lightweight material. Enclosure 12 can be of any convenient size and shape, but in one non-limiting embodiment is shaped like a box. A toilet seat 14 hinged for easy gentle opening is mounted onto a top horizontal surface of enclosure 12. The seat 14 can be lifted up with or without cover in a conventional manner. Beneath the seat is a passageway defined by a cylindrical baffle 30 that functions to direct waste into a catchment pan 20 (see FIGS. 2, 3 & 4).

Figure 5A:
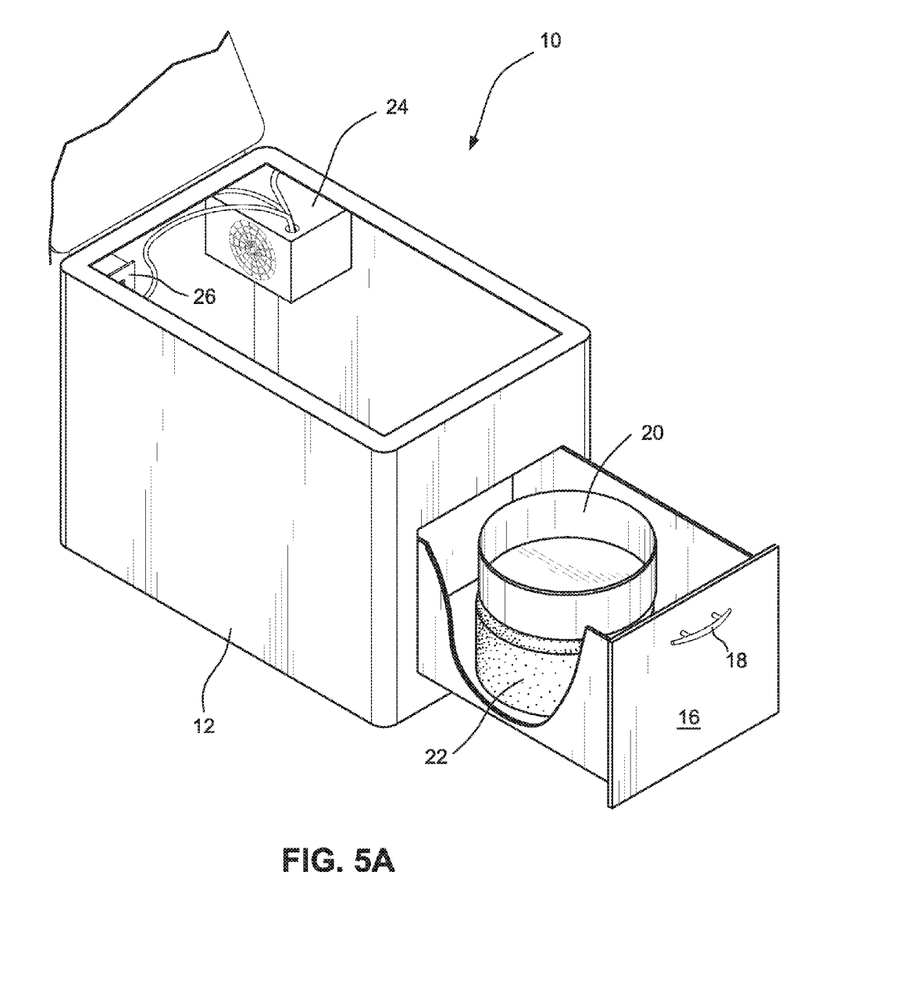
FIG. 5A shows a further cutaway view of the FIG. 1 toilet.
Figure 5B:
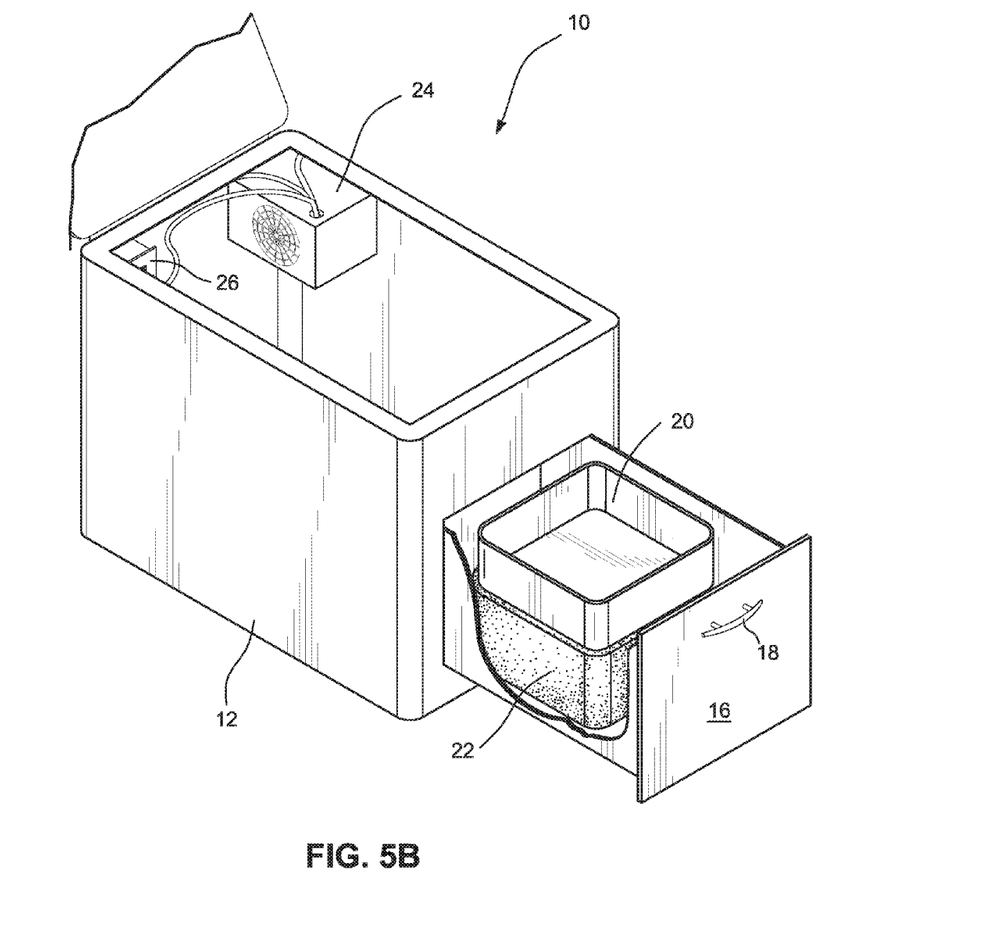
FIG. 5B shows a cutaway view of the FIG. 1 toilet with a differently configured (i.e., rectangular) induction heating system and associated pan.
Figure 6:
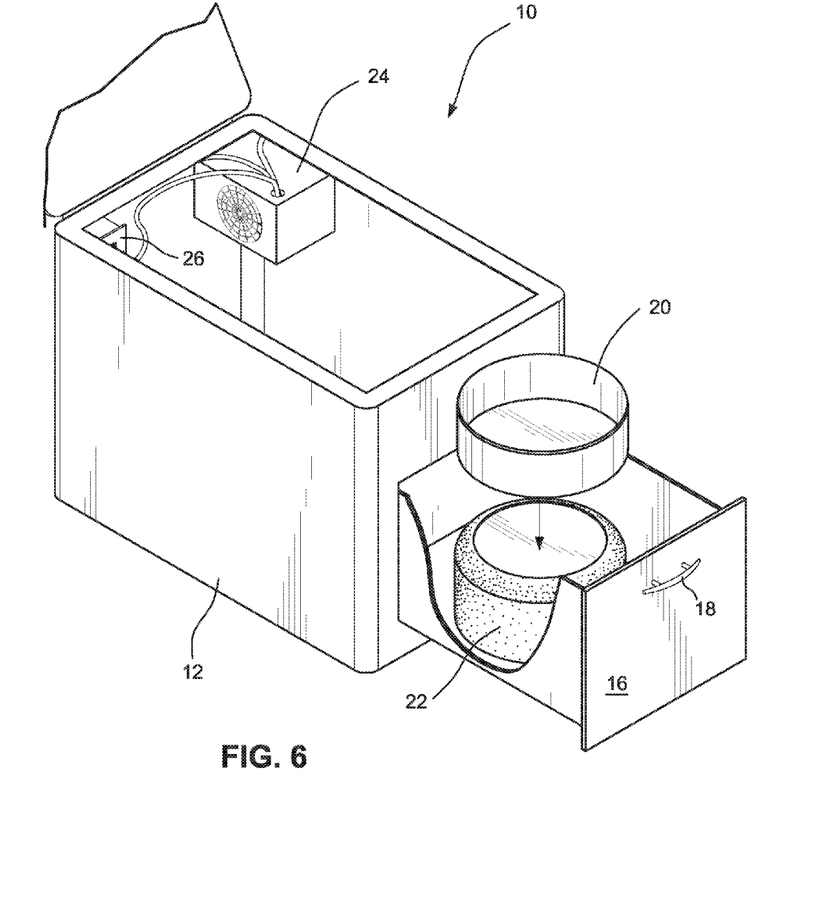
FIG. 6 shows an exploded view of the FIG. 1 toilet.

An access drawer 16 with pull 18 is located on a front surface of enclosure 12. The access drawer 16 when opened exposes an induction heating unit and associated ferromagnetic waste collection pan 20 (see FIGS. 5A and 5B, showing differently sized and dimensioned catchment pans).

Figure 7:
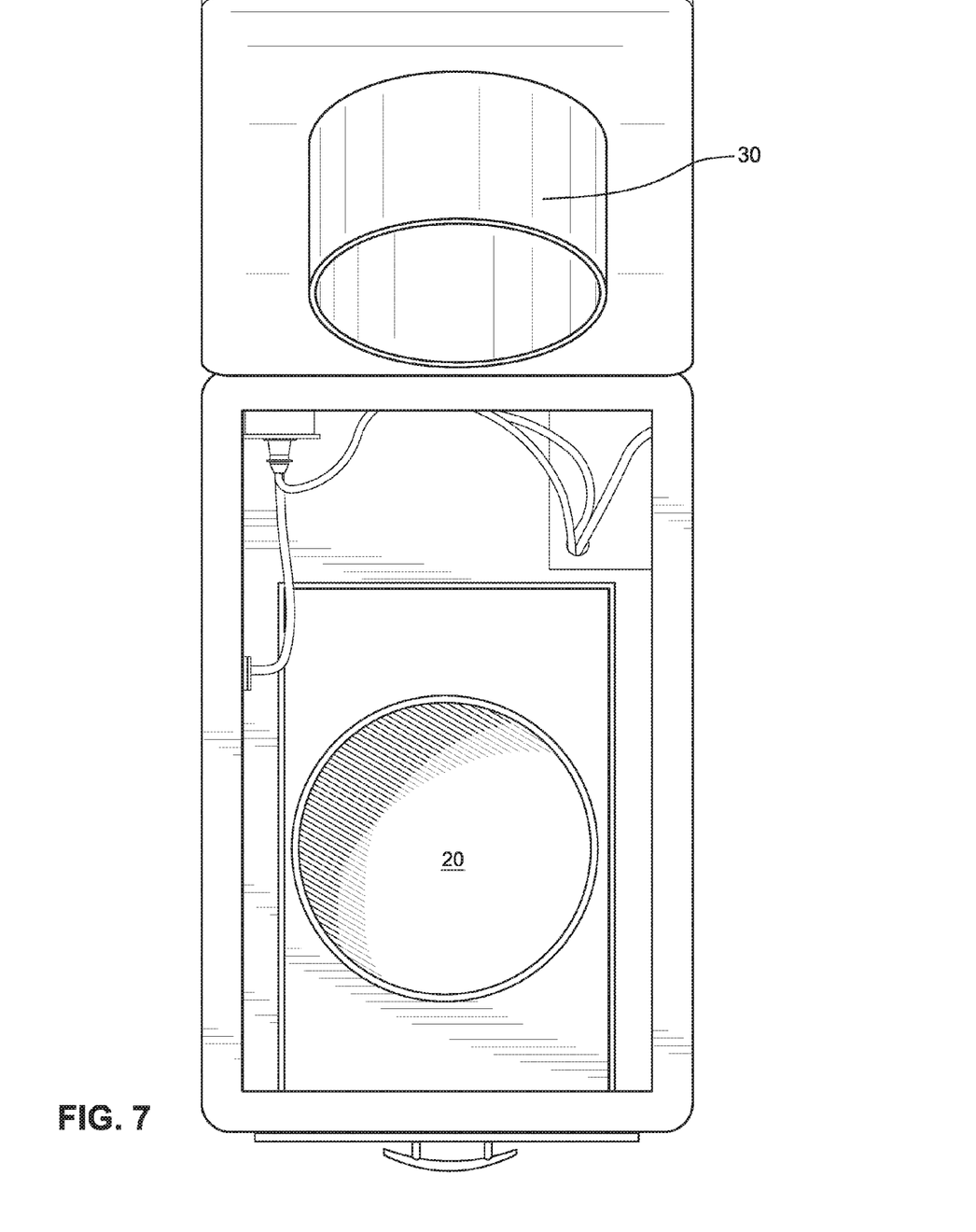
FIG. 7 shows a top plan view of the FIG. 1 toilet.

The induction heating unit 22 may comprise is a magnetic induction electrical plate in one example embodiment. The induction heating unit 22 may for example comprise an AC power supply the output of which is connected via a feedback control circuit to a transformer primary. See e.g., http://www.st.com/st-web-ui/static/active/en/resource/technical/document/application_note/CD00115561.pdf, which is incorporated herein by reference as if expressly set forth. The AC power supply may be turned on and off manually by a switch 40 operable from outside the enclosure 12. A blower unit 24 and Ground Fault Interrupter 26 (see FIG. 3) will also be visible when the top of the enclosure is open. They are attached, one on either side of the unit. A vent port 28 comprising four-inch tubing for venting with a white collar to hold it in place on the unit is also located on the outside of enclosure 12. There is also an electrical cord (partially shown in FIG. 7) for plugging the unit into standard household current The above application note describes one example suitable induction heating arrangement including a microcontroller that outputs to a driver which in turn drives two insulated gate bipolar transistors (IGBTs). As shown in the Figures, some or all of the induction heating unit 22 may be located within a drawer that can be pulled out to remove the catchment pan 20. In other examples, the induction heating unit 22 can be stationary within enclosure 12 and the catchment pan 20 alone can be removable, with an arrangement to ensure sanitary removal and replacement as well as providing contact between the catchment pan and appropriate elements of the induction heating unit 22. The induction heating unit 22 and catchment pan can be circular (see FIG. 5A), rectangular (see FIG. 5B) or any other convenient shape.

An isolated power supply powered directly from the mains (110 or 220 VAC 50 or 60 Hz) is used to supply power to the IGBT driver, relay and feedback circuitry, and also to the MCU. A microcontroller controls the whole process and communicates with a user interface (which can include buttons and display), drives the fan or blower and a relay, receives feedback from the heating element and generates a pulse width modulated (PWM) signal to drive the IGBTs. The IGBTs are driven by high frequency complementary square waves with 50% duty cycle. The pulse width modulated signal is applied to the driver input and can be generated directly by the MCU. The frequency varies in a range between 19 kHz and 60 kHz. A current feedback signal sends the MCU an image of the current flowing through the plate. This signal is used to monitor the current and set it in accordance with the selected working level.

In some embodiments, the top panel need not open and all access is through opening drawer 16.

When the system is first turned on e.g., by pressing an on-off button, the induction system performs a sequence: safety relay first, then plate power-on. The safety relay contacts close, which applies the DC link voltage to a resonant tank circuit. At this point, the system temporarily powers-on the plate: a 60 kHz PWM signal is applied to the half-bridge driver for half a second. During this time, if the catchment pan is present on the plate, the system moves to the lowest operating power level, shown as "1" in the user interface display. If however, no pan is detected on the plate, the system stops the PWM signal. Another power-on sequence is performed after 10 seconds. After 5 unsuccessful power-on sequences, the system goes back to standby mode.

When the catchment pan is detected, the MCU can move through 9 working power levels depending on need to more or less rapidly heat and evaporate the pan contents. The MCU may turn the power to the plate off automatically after a predetermined timed period to reduce energy consumption.

Thus, when an alternating electrical current is applied to the primary of the induction transformer, an alternating magnetic field is created. According to Faraday's Law, if the secondary of the transformer is located within the magnetic field, an electric current will be induced. In a basic induction heating setup, a solid state RF power supply sends an AC current through an inductor (often a copper coil), and the ferromagnetic catchment pan to be heated is placed near the inductor. The inductor serves as the transformer primary and the part to be heated becomes a short circuit secondary. When the ferromagnetic metal pan is placed within the inductor and is disposed within the alternating magnetic field, circulating eddy currents are induced within the catchment pan. The pan and its contents are heated without generating any additional heat in the surroundings.

The eddy currents flow against the electrical resistivity of the ferromagnetic metal, generating precise and localized heat without any direct contact between the part and the inductor. This heating occurs with both magnetic and non-magnetic catchment pans, and is often referred to as the "Joule effect", referring to Joule's first law—a scientific formula expressing the relationship between heat produced by electrical current passed through a conductor.

In the process of heating the material, there is therefore no contact between the inductor and the part, and neither are there any combustion gases. The material to be heated can be located in a setting isolated from the power supply; contain a liquid, covered by isolated substances, and the like. See e.g., http://www.gh-ia.com/induction_heating.html.

Preparing the Toilet for Use

Connect one end of the vent tube to the toilet. Connect the other end to an existing vent (such as for an existing bathroom toilet) or through a window, roof or external wall (much like venting a clothes dryer). Note: The vent should be no less than four inches in diameter in order to allow for adequate circulation of air. Remove the heating plate from its package, read the instructions, then place it into the drawer. Open the casing and plug the electrical cord of the heating plate into the top plug in of the GFI. When you are ready to use the unit for the first time, plug the unit into the wall plug. The blower will begin running and should be left on continuously. The heater should be used sparingly and not at all until after the first 4-5 uses.

Operating the Toilet

After the first four uses turn on the heater. Controls for the heater are at the front of the drawer: just pull out the drawer and follow the instructions. Set the heater to run for 10-15 minutes at 390 degrees F. It will turn itself off. You can check the liquid by pulling the drawer part way out.

Do not use the toilet while the heater is running.

Note that the heater generates an electrical current that could interfere with a pacemaker. We recommend that if you have a pacemaker have somebody else turn the heater on just to be on the safe side. The blower, which runs all the time, does not interfere with pacemakers from a distance.

Run the heater for 10-15 minutes after every five or six uses. It is important not to run the heater once the liquid in the collecting pan is almost gone. If the heater runs while the pan is dry the finish on the magnetic induction plate will scorch and the plate will not work.

When the collecting pan is nearly full run the heater, no more than 10-15 minutes at a time, 390 degrees F. until the pan is almost dry, then allow the blower to finish the drying process and cool the collecting pan. Then empty the pan into the trash. Take care not to overload the collecting pan with solids.

The unit over a 24-hour period will evaporate liquids at the rate of about 4-5 uses per hour or 96-120 uses total if the heater is run for 10-15 minutes after every 5 uses. If used more at a given time and less at another time it will catch up on the drying process. Because the blower is venting out air non-stop there will be no odor buildup. Allow the blower to keep operating even when emptying out the collecting pan, assuring that any and all moisture and odor is sucked out from the toilet.

The unit will use approximately one kilowatt of electricity daily.

In the event there is a loss of power the fan will stop operating. You should immediately remove the collecting pan to ensure there is no odor.

Except when being used, the toilet seat and toilet lid should remain shut.

Do not use the toilet while the heater is running you may burn your bottom.

Do not put foreign objects into the toilet.

Do not throw lit cigarettes into the toilet, this could cause a fire.

Do not pour water into the toilet when cleaning the seat.

Maintenance

When the collecting pan is nearly full run the heater, no more than 10-15 minutes at a time, until the pan is almost dry. Let the blower finish the drying process and then cool the collecting pan and empty the pan into the trash using the pot holder clips provided. Do not overload the collecting pan with solids. Leave some room so that when you lift it out of the tray there is no danger of spillage. If you wish to clean the pan, simply wash with soap and water periodically after emptying. In the event you are in a hurry to dry what is in the collecting pan, run the heater several times but no more than 10 minutes at a time and only until the bottom of the pan is nearly but not quite dry. Turn off the heater and allow the blower to finish the drying process. When you know the toilet will not be used for a few hours the blower will be drying the solids, and that may be the most convenient way to dry the waste matter sufficiently before disposing of it in the trash.

Clean the toilet seat as you would any other toilet seat but do not allow cleaning solvent to fall into the collecting pan.

Be sure to use gloves at all times and wash your hands with soap and water when finished changing out the collecting pan or cleaning the toilet seat.

Safety Features

Ground Fault Interrupter (GFI): The unit is equipped with a GFI built into it. This is a failsafe device that prevents electrical arcing and shock. The GFI automatically kills the flow of electricity if arcing is about to occur. This safety feature, while not likely to be needed under any circumstances, makes the product safe to use near standing water. Whenever electrical devices are used around water, such as shower stalls or bathtubs, there is always the remote chance of electricity arcing, and thus the GFI is built into the unit.

Sanitized Waste: Human liquid and solid waste were tested for toxicity by the Regional Medical Laboratory in Tulsa, Okla. All of the results were negative for *salmonella*, shield, *campylobacter, E. coli*, shag toxin, toxigenic *clostridium difficile* and *cryptosporidium giardia* intestinalis (*lamblia*). The toilet safely and efficiently sanitizes human waste.

Heat Shutoff Temperature Control: The timer built into the heating plate automatically shuts off the heating unit after it has run for the amount of time that is set. Set the heat for 390 degrees F. Paper burns at 440 degrees F. No special kind of toilet paper is required.

Constant Exhaust Airflow: When the unit is plugged in the exhaust blower draws air into the unit from under the toilet seat, sending it through the unit and out the exhaust vent. This makes it impossible for any odor or gas such as methane to build up. This also is why it is important to remove the waste immediately if there is a power shutdown.

Waste Disposal: Waste removed from the example non-limiting embodiment should not to be used as compost.

Safety Latch: A safety latch is provided to hold the toilet seat closed. Do not allow little children to play around this product without an adult present.

An easy way to understand how the magnetic induction plate works before you put the plate into the drawer with the collecting pan on top, try it out free standing. Put the collecting pan on top of the plate and pour in 16 ounces of water (the average amount of human urination is six ounces). Following the instructions carefully, set the time for 7 minutes, turn on the heating plate and watch what happens! When the water is nearly gone quickly turn off the heating plate.

Also, if you plan to use the pot holder clips to lift the pan out of the unit when it is full, practice a few times before you set up the unit, including lifting up the pan with weight in it, until you are comfortable and confident that that the pan will not slip from your grasp or spill.

When actually emptying the collecting pan be sure to have close at hand the receptacle into which you dump it. Do not be carrying the collecting pan around.

It is easy to check the collecting pan liquid level, just slide the drawer open part of the way.

There is a timer and the user is instructed to it to run for 30 minutes at any given time if turned on manually and 30 minutes every 12 hours if simply set and then left alone (or this operation can be automated using an appropriately programmed microprocessor or other process). The reason for 30 minutes is that longer than 30 minutes at any given time might in some cases heat the outside of the unit up to a point where it would be too hot to touch. The heat must be sufficient to kill pathogens, and the lab tests show that at these intervals for 30 minutes at 350 degrees it tests negative for pathogens. Another consideration is to keep the energy use to a minimum. If not used for 2 weeks, the unit should be emptied and then turned off before the user leaves. If left alone and plugged in, the unit will continue to operate, including the heat at the intervals set on the timer. An "override" is accomplished by using a switch on the outside of the unit, located on the right side as one stands in front of the unit facing the toilet. That switch only overrides the heater. The blower runs as long as the unit is plugged in regardless of whether the heater is running.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. An evaporative toilet comprising:
    an enclosure including a toilet seat area defining an opening;
    a removable ferromagnetic pan disposed within the enclosure, the pan being positioned, sized and configured to collect both solids and liquids deposited into the enclosure through the opening;
    an induction heating element magnetically coupled to the ferromagnetic pan, the induction heating element inducing eddy currents in the pan that heat the solids and liquids in the pan to a temperature within a temperature range that kills pathogens in the solids to thereby sanitize the solids, and helps to evaporate the liquids but is not hot enough to incinerate the solids; and
    an active air flow element that draws air into the enclosure from the toilet seat area, circulates the air within the enclosure, and expels moisture-landed air evaporated from the liquids through an air outlet;
    wherein the air outlet is in communication with said enclosure, said air outlet exhausting the odors and moisture-laden air from said enclosure to thereby vent evaporated water vapor from the liquids and solids in a sanitary manner;
    wherein the enclosure defines an access port therein, the access port and enclosure being configured to enable an end user to remove the pan containing sanitized matter from the enclosure through the access port.

2. The toilet of claim 1 further including a timer that provides a timed operation for the induction heating element.

3. The toilet of claim 1 wherein the air flow element comprises a continually operating electrically-powered blower.

4. The toilet of claim 1 further including a ground fault protected circuit for providing electric power to the induction heating element and the air flow element.

5. The toilet of claim 1 wherein the access port comprises a slidable drawer.

6. The toilet of claim 1 wherein the induction heating element is operated in intervals.

7. The toilet of claim 1 wherein the active air flow element constantly draws air.

8. The toilet of claim 1 wherein the induction heating element is activated only once for multiple uses.

9. The toilet of claim 1 further including a humidity sensor connected to selectively activate the active air flow element.

10. The toilet of claim 1 wherein the toilet has a single moving part comprising the active air flow element.

11. The toilet of claim 1 wherein the toilet reduces human waste to a lightweight, sanitized form that is discardable by the end user.

12. The toilet of claim 1 wherein the toilet dries and sanitizes solids and evaporates liquids, using air flow and bursts of induction powered heat.

13. The toilet of claim 1 further including a baffle that directs waste from the toilet seat area into the pan.

14. The toilet of claim 1 further including a microcontroller that controls at least the induction heating element.

15. The toilet of claim 1 further including an electrical controller that applies a pulse width modulated burst signal to the induction heating element.

16. The toilet of claim 1 further including a current feedback loop that monitors current flowing through induction heating element and is used to control said current to achieve a selected working level that kills pathogens and avoids incineration.

17. The toilet of claim 1 further including a sensing arrangement that automatically senses the presence of the pan.

18. The toilet of claim 1 wherein the induction heating element provides plural working power levels depending on a desired rate to heat and evaporate the pan contents.

19. The toilet of claim 1 further including a timer that turns power to the induction heating unit off automatically after a predetermined timed period.

* * * * *